United States Patent
Naidu et al.

(10) Patent No.: US 7,136,451 B2
(45) Date of Patent: Nov. 14, 2006

(54) METHOD OF AND SYSTEM FOR STABILIZING HIGH VOLTAGE POWER SUPPLY VOLTAGES IN MULTI-ENERGY COMPUTED TOMOGRAPHY

(75) Inventors: Ram Naidu, Newton, MA (US); Zhengrong Ying, Wakefield, MA (US); Carl R. Crawford, Brookline, MA (US)

(73) Assignee: Analogic Corporation, Peabody, MA (US)

( * ) Notice: Subject to any disclaimer, the term of this patent is extended or adjusted under 35 U.S.C. 154(b) by 102 days.

(21) Appl. No.: 10/958,713

(22) Filed: Oct. 5, 2004

(65) Prior Publication Data

US 2006/0072703 A1  Apr. 6, 2006

(51) Int. Cl.
*A61B 6/03* (2006.01)
*H05G 1/32* (2006.01)
(52) U.S. Cl. ......................... 378/16; 378/112
(58) Field of Classification Search ............... 378/111, 378/112, 16, 57
See application file for complete search history.

(56) References Cited

U.S. PATENT DOCUMENTS

| | | | |
|---|---|---|---|
| 3,293,433 A * | 12/1966 | Yokota et al. ............ 250/484.5 |
| 4,029,963 A | 6/1977 | Alvarez et al. |
| 4,625,698 A * | 12/1986 | Jamrog ....................... 123/696 |
| 4,686,631 A * | 8/1987 | Ruud .......................... 702/42 |
| 4,704,600 A * | 11/1987 | Uchimura et al. .......... 341/122 |
| 4,759,047 A | 7/1988 | Donges et al. |
| 4,884,289 A | 11/1989 | Glockmann et al. |
| 5,132,998 A | 7/1992 | Tsutsui et al. |
| 5,182,764 A | 1/1993 | Peschmann et al. |
| 5,247,561 A | 9/1993 | Kotowski |
| 5,319,547 A | 6/1994 | Krug et al. |
| 5,367,552 A | 11/1994 | Peschmann et al. |
| 5,473,657 A | 12/1995 | McKenna |
| 5,490,218 A | 2/1996 | Krug et al. |
| 5,548,501 A * | 8/1996 | Chen ....................... 363/21.05 |
| 5,661,774 A | 8/1997 | Gordon et al. |
| 5,802,134 A | 9/1998 | Larson et al. |
| 5,881,122 A | 3/1999 | Crawford et al. |

(Continued)

FOREIGN PATENT DOCUMENTS

DE     3150306     12/1981

*Primary Examiner*—Courtney Thomas
*Assistant Examiner*—Chih-Cheng Glen Kao
(74) *Attorney, Agent, or Firm*—McDermott Will & Emery LLP

(57) ABSTRACT

A method of and a system for stabilizing High Voltage Power Supply (HVPS) DC and AC voltages in multi-energy X-ray computed tomography scanners are provided. The method comprises generating filter ratios, computing DC and AC voltages, and feeding back the computed DC and AC voltages to the commanded voltages. The filtered ratios including an air ratio and a copper ratio are modeled as nonlinear functions of the DC and AC voltages. Computing DC and AC voltages include computing an m-ratio and an n-ratio. The parameters of the nonlinear model comprise an exponent parameter and a set of polynomial coefficients. The parameters are determined by a calibration procedure, which performs scanning at different combination of DC and AC voltages. The optimal parameters are obtained through a nonlinear least square minimization, which is solved through a brute force search over the exponent parameter and a closed form solution of the polynomial coefficients. Feeding back the computed DC and AC voltages include comparing the computed voltages with commanded voltages, integrating the difference between the computed voltages and commanded voltages, and adding the integrated voltage differences to the commanded voltages.

29 Claims, 12 Drawing Sheets

U.S. PATENT DOCUMENTS

| | | | |
|---|---|---|---|
| 5,887,047 A | 3/1999 | Bailey et al. | |
| 5,901,198 A | 5/1999 | Crawford et al. | |
| 5,909,477 A | 6/1999 | Crawford et al. | |
| 5,932,874 A | 8/1999 | Legg et al. | |
| 5,937,028 A | 8/1999 | Tybinkowski et al. | |
| 5,949,842 A | 9/1999 | Schafer et al. | |
| 5,970,113 A | 10/1999 | Crawford et al. | |
| 5,982,843 A | 11/1999 | Bailey et al. | |
| 5,982,844 A | 11/1999 | Tybinkowski et al. | |
| 6,026,143 A | 2/2000 | Simanovsky et al. | |
| 6,026,171 A | 2/2000 | Hiraoglu et al. | |
| 6,035,014 A | 3/2000 | Hiraoglu et al. | |
| 6,067,366 A | 5/2000 | Simanovsky et al. | |
| 6,075,871 A | 6/2000 | Simanovsky et al. | |
| 6,076,400 A | 6/2000 | Bechwati et al. | |
| 6,078,642 A | 6/2000 | Simanovsky et al. | |
| 6,091,795 A | 7/2000 | Schafer et al. | |
| 6,108,396 A | 8/2000 | Bechwati et al. | |
| 6,111,974 A | 8/2000 | Hiraoglu et al. | |
| 6,128,365 A | 10/2000 | Bechwati et al. | |
| 6,195,444 B1 | 2/2001 | Simanovsky et al. | |
| 6,256,404 B1 | 7/2001 | Gordon et al. | |
| 6,272,230 B1 | 8/2001 | Hiraoglu et al. | |
| 6,345,113 B1 | 2/2002 | Crawford et al. | |
| 6,411,673 B1 * | 6/2002 | Bromberg et al. | 378/19 |
| 6,687,326 B1 | 2/2004 | Bechwati et al. | |
| 6,721,387 B1 | 4/2004 | Naidu et al. | |
| 6,748,043 B1 | 6/2004 | Dobbs | |

* cited by examiner

| $k$ | 0 | 1 | 2 | 3 | 4 | 5 | 6 | 7 | 8 | 9 | 10 | 11 |
|---|---|---|---|---|---|---|---|---|---|---|---|---|
| $\widetilde{V}_{DC}(k)$ (kV) | 120 | 120 | 102 | 120 | 120 | 120 | 140 | 140 | 140 | 140 | 140 | 140 |
| $\widetilde{V}_{AC}(k)$ (kV) | 0 | 8 | 16 | 24 | 32 | 40 | 0 | 8 | 16 | 24 | 32 | 40 |

*FIG. 12*

METHOD OF AND SYSTEM FOR STABILIZING HIGH VOLTAGE POWER SUPPLY VOLTAGES IN MULTI-ENERGY COMPUTED TOMOGRAPHY

RELATED APPLICATIONS

This patent application and/or patents are related to the following co-pending U.S. applications and/or issued U.S. patents, of the assignee as the present application, the contents of which are incorporated herein in their entirety by reference:

"Nutating Slice CT Image Reconstruction Apparatus and Method," invented by Gregory L. Larson, et al., U.S. application Ser. No. 08/831,558, filed on Apr. 9, 1997, now U.S. Pat. No. 5,802,134, issued on Sep. 1, 1998;

"Computed Tomography Scanner Drive System and Bearing," invented by Andrew P. Tybinkowski, et al., U.S. application Ser. No. 08/948,930, filed on Oct. 10, 1997, now U.S. Pat. No. 5,982,844, issued on Nov. 9, 1999;

"Air Calibration Scan for Computed Tomography Scanner with Obstructing Objects," invented by David A. Schafer, et al., U.S. application Ser. No. 08/948,937, filed on Oct. 10, 1997, now U.S. Pat. No. 5,949,842, issued on Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997, now U.S. Pat. No. 5,970,113, issued on Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997, now U.S. Pat. No. 5,909,477, issued on Jun. 1, 1999;

"Computed Tomography Scanning Target Detection Using Target Surface Normals," invented by Christopher C. Ruth, et al., U.S. application Ser. No. 08/948,929, filed on Oct. 10, 1997, now U.S. Pat. No. 5,901,198, issued on May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997, U.S. Pat. No. 5,887,047, issued on Mar. 23, 1999;

"Computed Tomography Scanning Apparatus and Method For Generating Parallel Projections Using Non-Parallel Slice Data," invented by Christopher C. Ruth, et al., U.S. application Ser. No. 08/948,492, filed on Oct. 10, 1997, now U.S. Pat. No. 5,881,122, issued on Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997, now U.S. Pat. No. 6,256,404, issued on Jul. 3, 2001;

"Area Detector Array for Computed Tomography Scanning System," invented by David A Schafer, et al., U.S. application Ser. No. 08/948,450, filed on Oct. 10, 1997, now U.S. Pat. No. 6,091,795, issued on Jul. 18, 2000;

"Closed Loop Air Conditioning System for a Computed Tomography Scanner," invented by Eric Bailey, et al., U.S. application Ser. No. 08/948,692, filed on Oct. 10, 1997, now U.S. Pat. No. 5,982,843, issued on Nov. 9, 1999;

"Measurement and Control System for Controlling System Functions as a Function of Rotational Parameters of a Rotating Device," invented by Geoffrey A. Legg, et al., U.S. application Ser. No. 08/948,493, filed on Oct. 10, 1997, now U.S. Pat. No. 5,932,874, issued on Aug. 3, 1999;

"Rotary Energy Shield for Computed Tomography Scanner," invented by Andrew P. Tybinkowski, et al., U.S. application Ser. No. 08/948,698, filed on Oct. 10, 1997, now U.S. Pat. No. 5,937,028, issued on Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998, now U.S. Pat. No. 6,111,974, issued on Aug. 29, 2000;

"Apparatus and Method for Eroding Objects in Computed Tomography Data," invented by Sergey Simanovsky, et al., U.S. application Ser. No. 09/021,781, filed on Feb. 11, 1998, now U.S. Pat. No. 6,075,871, issued on Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998, now U.S. Pat. No. 6,128,365, issued on Oct. 3, 2000;

"Apparatus and Method for Detecting Sheet Objects in Computed Tomography Data," invented by Sergey Simanovsky, et al., U.S. application Ser. No. 09/022,165, filed on Feb. 11, 1998, now U.S. Pat. No. 6,025,143, issued on Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998, now U.S. Pat. No. 6,076,400, issued on Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998, now U.S. Pat. No. 6,108,396, issued on Aug. 22, 2000;

"Apparatus and Method for Density Discrimination of Objects in Computed Tomography Data Using Multiple Density Ranges," invented by Sergey Simanovsky, et al., U.S. application Ser. No. 09/021,889, filed on Feb. 11, 1998, now U.S. Pat. No. 6,078,642, issued on Jun. 20, 2000;

"Apparatus and Method for Detection of Liquids in Computed Tomography Data," invented by Muzaffer Hiraoglu, et al., U.S. application Ser. No. 09/022,064, filed on Feb. 11, 1998, now U.S. Pat. No. 6,026,171, issued on Feb. 15, 2000;

"Apparatus and Method for Optimizing Detection of Objects in Computed Tomography Data," invented by Muzaffer Hiraoglu, et al., U.S. application Ser. No. 09/022,062, filed on Feb. 11, 1998, now U.S. Pat. No. 6,272,230, issued on Aug. 7, 2001;

"Multiple-Stage Apparatus and Method for Detecting Objects in Computed Tomography Data," invented by Muzaffer Hiraoglu, et al., U.S. application Ser. No. 09/022,164, filed on Feb. 11, 1998, now U.S. Pat. No. 6,035,014, issued on Mar. 7, 2000;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998, now U.S. Pat. No. 6,067,366, issued on May 23, 2000;

"Apparatus and method for processing object data in computed tomography data using object projections," invented by Carl R. Crawford, et al, U.S. application Ser. No. 09/228,379, filed on Jan. 12, 1999, now U.S. Pat. No. 6,345,113, issued on Feb. 5, 2002;

"Apparatus and method for detecting concealed objects in computed tomography data," invented by Sergey Simanovsky, et al., U.S. application Ser. No. 09/228,380, filed on Jan. 12, 1999, now U.S. Pat. No. 6,195,444, issued on Feb. 27, 2001;

"Method of and system for correcting scatter in a computed tomography scanner," invented by Ibrahim M. Bechwati, et al, U.S. application Ser. No. 10/121,466, filed on Apr. 11, 2002, now U.S. Pat. No. 6,687,326, issued on Feb. 3, 2004;

"Method of and system for reducing metal artifacts in images generated by x-ray scanning devices," invented by Ram Naidu, et al, U.S. application Ser. No. 10/171,116, filed on Jun. 13, 2002, now U.S. Pat. No. 6,721,387, issued on Apr. 13, 2004;

"Method and apparatus for stabilizing the measurement of CT numbers," invented by John M. Dobbs, U.S. application Ser. No. 09/982,192, filed on Oct. 18, 2001, now U.S. Pat. No. 6,748,043, issued on Jun. 8, 2004;

"Method and apparatus for automatic image quality assessment," invented by Seemeen Karimi, et al, U.S. application Ser. No. 09/842,075, filed on Apr. 25, 2001, now allowed;

"Decomposition of Multi-Energy Scan Projections using Multi-Step Fitting," invented by Ram Naidu, et al, U.S. application Ser. No. 10/611,572, filed on Jul. 1, 2003;

"Method of and system for detecting threat objects using computed tomography images," invented by Zhengrong Ying, et al, U.S. application Ser. No. 10/831,909, filed on Apr. 26, 2004;

"Method of and system for computing effective atomic number image in multi-energy computed tomography," invented by Zhengrong Ying, et al, U.S. application Ser. No. 10/850,910, filed on May 21, 2004;

"Method of and system for adaptive scatter correction in multi-energy computed tomography," invented by Zhengrong Ying, et al, U.S. application Ser. No. 10/853,942, filed on May 26, 2004;

"Method of and system for destreaking the photoelectric image in multi-energy computed tomography," invented by Zhengrong Ying, et al, U.S. application Ser. No. 10/860,984, filed on Jun. 4, 2004;

"Method of and system for extracting 3D bag images from continuously reconstructed 2D image slices in computed tomography," invented by Zhengrong Ying, et al, U.S. application Ser. No. 10/864,619, filed on Jun. 9, 2004;

"Method of and system for X-ray spectral correction in multi-energy computed tomography," invented by Ram Naidu, et al, U.S. application Ser. No. 10/899,775, filed on Jul. 17, 2004.

FIELD OF THE DISCLOSURE

The present disclosure relates to systems and methods for processing projection data in a computed tomography scanner, and more particularly to a method of and a system for stabilizing high voltage power supply voltages to minimize X-ray spectral variations in multi-energy computed tomography scanners.

BACKGROUND OF THE DISCLOSURE

Various X-ray baggage scanning systems are known for detecting the presence of explosives and other prohibited items in baggage, or luggage, prior to loading the baggage onto a commercial aircraft. A common technique of measuring a material's density is to expose the material to X-rays and to measure the amount of radiation absorbed by the material, the absorption being indicative of the density. Since many explosive materials may be characterized by a range of densities differentiable from that of other items typically found in baggage, explosives are generally amenable to detection by X-ray equipment.

Most X-ray baggage scanning systems in use today are of the "line scanner" type and include a stationary X-ray source, a stationary linear detector array, and a conveyor belt for transporting baggage between the source and detector array as the baggage passes through the scanner. The X-ray source generates an X-ray beam that passes through and is partially attenuated by the baggage and is then received by the detector array. During each measuring interval the detector array generates data representative of the integral of density of the planar segment of the baggage through which the X-ray beam passes, and this data is used to form one or more raster lines of a two-dimensional image. As the conveyor belt transports the baggage past the stationary source and detector array, the scanner generates a two-dimensional image representative of the density of the baggage, as viewed by the stationary detector array. The density image is typically displayed for analysis by a human operator.

Techniques using dual energy X-ray sources are known for providing additional information about a material's characteristics, beyond solely a density measurement. Techniques using dual energy X-ray sources involve measuring the X-ray absorption characteristics of a material for two different energy levels of X-rays. Depending upon the calibration of the scanner, dual energy measurements provide an indication of dual parameters of the material being scanned. For example, at one calibration setting, the dual parameters can be chosen to be the material's effective atomic number (Z is denoted as "effective atomic number") and the material's density. At another calibration setting, the dual parameters can be chosen to be the material's Photoelectric coefficients and the material's Compton coefficients. At yet another calibration setting, the dual parameters can be chosen to be an amount of a first material present (e.g., plastic) and an amount of a second material present (e.g., aluminum). Dual energy X-ray techniques for energy-selective reconstruction of X-ray Computer Tomography (hereinafter referred to as CT) images are described, for example, in Robert E. Alvarez and Albert Macovski, "Energy-selective Reconstructions in X-ray Computerized Tomography," Phys. Med. Biol. 1976, Vol. 21, No. 5, 733–744; and U.S. Pat. Nos. 4,029,963 and 5,132,998. One algorithm used to generate such dual parameters from dual energy X-ray projection data is known as the Alvarez/Macovski Algorithm (hereinafter referred to as AMA). Others are known in the art.

One proposed use for such dual energy techniques has been in connection with a baggage scanner for detecting the presence of explosives in baggage. Explosive materials are generally characterized by a known range of atomic numbers and are therefore amenable to detection by such dual energy X-ray sources. One such dual energy source is described in U.S. Pat. No. 5,661,774, entitled "Improved Dual Energy Power Supply," assigned to the present assignee and incorporated herein by reference. Other dual energy sources are known in the art.

Most explosives capable of significantly damaging an aircraft are sufficiently large in length, width, and height so as to be readily detectable by an X-ray scanner system regardless of the explosive's orientation within the baggage. Plastic explosives, however, present a particular challenge to baggage scanning systems. Due to their moldable nature, plastic explosives may be formed into geometric shapes that are difficult to detect. A plastic explosive powerful enough to damage an aircraft may be formed into a relatively thin sheet that is extremely small in one dimension and is relatively large in the other two dimensions. The detection of plastic explosives may be difficult because it may be difficult to see the explosive material in the image, particularly when the material is disposed so that the thin sheet is parallel to the direction of the X-ray beam as the sheet passes through the system.

Thus, detection of suspected baggage requires very attentive operators. The requirement for such attentiveness can result in greater operator fatigue, and fatigue as well as any distractions can result in a suspected bag passing through the system undetected. Accordingly, a great deal of effort has been made to design a better baggage scanner. Such designs, for example, have been described in U.S. Pat. No. 4,759,047 (Donges et al.); U.S. Pat. No. 4,884,289 (Glockmann et al.); U.S. Pat. No. 5,132,988 (Tsutsui et al.); U.S. Pat. No. 5,182,764 (Peschmann et al.); U.S. Pat. No. 5,247,561 (Kotowski); U.S. Pat. No. 5,319,547 (Krug et al.); U.S. Pat. No. 5,367,552 (Peschmann et al.); U.S. Pat. No. 5,490,218 (Krug et al.) and German Offenlegungsschrift DE 31 503 06 A1 (Heimann GmbH).

At least one of these designs, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "Invision Machine." The Invision Machine includes a CT scanner of the third generation type, which typically includes an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include a linear array of detectors disposed as a single row in the shape of a circular arc having a center of curvature at the focal spot of the X-ray source, i.e., the point within the X-ray source from which the X-rays emanate. The X-ray source generates a fan shaped beam, or fan beam, of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is designed to be relatively thin in the Z-axis direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors in a single row of the detector array for any measuring interval is referred to as a "projection," or equivalently as a "view," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from an appropriate point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well-known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner. In general, the resolution of the CT image is inversely proportional to the width of the receiving surface of each detector in the plane of the fan beam.

Referring to the drawings, FIGS. 1, 2 and 3 show perspective, end cross-sectional and radial cross-sectional views, respectively, of a typical baggage scanning system 100, which includes a conveyor system 110 for continuously conveying baggage or luggage 112 in a direction indicated by arrow 114 through a central aperture of a CT scanning system 120. The conveyor system includes motor driven belts for supporting the baggage. Conveyer system 110 is illustrated as including a plurality of individual conveyor sections 122; however, other forms of conveyor systems may be used.

The CT scanning system 120 includes an annular shaped rotating platform, or disk, 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," which is assigned to the present assignee and, which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 is preferably a two-dimensional array, such as the array described in U.S. Pat. No. 6,091,795 entitled, "Area Detector Array for Computed Tomography Scanning System." Other suitable arrays are known in the art. The system 120 further includes a data acquisition system (DAS) 134 for receiving and processing signals generated by detector array 130, and an X-ray tube control system 136 for supplying power to, and otherwise controlling the operation of, X-ray tube 128. The system 120 is also preferably provided with a computerized system (not shown) for processing the output of the data acquisition system 134 and for generating the necessary signals for operating and controlling the system 120. The computerized system can also include a monitor for displaying information including generated images. System 120 also includes shields 138, which may be fabricated from lead, for example, for preventing radiation from propagating beyond gantry 125.

The X-ray tube 128 may generate a pyramidally shaped beam, often referred to as a "cone beam," 132 of X-rays that pass through a three dimensional imaging field, through which conveying system 110 transports baggage 112. After passing through the baggage disposed in the imaging field, detector array 130 receives cone beam 132 and generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the conveyor system 110 continuously transports baggage through central aperture 126, so as to generate a plurality of projections at a corresponding plurality of projection angles. When dual energy scanning mode is configured, the control system 136 supplies modulated high voltages with respect to alternating projection angles to the X-ray tube 128. The detector array 130 then receives data corresponding to high-energy and low-energy X-ray spectra in alternating projection angles.

Post-reconstruction analysis and pre-reconstruction analysis are the two prior art techniques generally recognized for using dual energy X-ray sources in materials analysis (e.g., in a baggage scanner for detecting the presence of explosives in baggage). In post-reconstruction analysis, the signal flow is as shown in FIG. 4. The scanner 120 is typically similar to the one shown in FIGS. 1–3 and has an X-ray source capable of producing a fan or cone beam at two distinct energy levels (i.e., dual energy). The DAS 134 gathers signals generated by detector array 130 at discrete angular positions of the rotating platform 124, and passes the signals to the pre-processing unit 206. The pre-processing unit 206 re-sorts the data it receives from the DAS 134 in order to optimize the sequence for the subsequent mathematical processing. The pre-processing unit 206 also corrects the data from the DAS 134 for detector temperature, intensity of the primary beam, gain and offset, and other deterministic errors. Finally, the pre-processing unit 206 extracts data corresponding to high-energy views and routes it to a high-energy path 208, and routes the data corresponding to low-energy views to a low-energy path 210. A first reconstruction computer 218 receives the projection data from the high-energy path 208 and generates a CT image $I_H$ 226 corresponding to the high-energy series of projections. A second reconstruction computer 220 receives the projection data from the low-energy path 210 and generates a CT image $I_L$ 224 corresponding to the low-energy series of projections. A post-processing unit 230 receives the high-energy CT image 226 and the low-energy CT image 224 and performs voxel-by-voxel processing to yield the effective atomic number (Z is denoted as effective atomic number) image $I_z$ 232. The Z image 232 and the high-energy CT image 226 can be provided to operators on a display 240, and both images can be used for automatic explosive detection in 238 as well. The images from the post-reconstruction analysis usually do not yield accurate estimates of the material's effective atomic number, and suffer low SNR (Signal to Noise Ratio) and many artifacts as well.

In pre-reconstruction analysis, the signal flow is as shown in FIG. 5. As is described herein for pre-reconstruction analysis, the dual energy decomposition computer 212 receives the projection data on the high-energy path 208 and the low-energy path 210 and performs the Alvarez/Macovski Algorithm to produce a first stream of projection data $A_c$ 214, which is dependent on a first parameter of the material being scanned, and a second stream of projection data $A_p$ 216, which is dependent on a second parameter of the material scanned. The first material parameter is often the Compton coefficient $a_c$, and the second material parameter is often the photoelectric coefficient $a_p$. A first reconstruction computer 219 receives the first stream of projection data 214 and generates a Compton image $I_c$ 227 from the series of projections corresponding to the first material parameter. A second reconstruction computer 221 receives the second stream of projection data 216 and generates a photoelectric image $I_p$ 225 from the series projections corresponding to the second material parameter. The third reconstruction computer 218 receives the stream of projection data 208 and generates a high-energy CT image $I_H$ 226. The two images 225 and 227 are processed in the post-processing unit 230 to yield a Z image $I_z$ 232. The High-energy CT image 226 and the Z image 232 can be provided to operators on a display 240, and both images can be used for automatic explosive detection in detection unit 238 as well. The pre-reconstruction analysis yields better estimates of material's effective atomic number than the post-reconstruction analysis. However the pre-reconstruction analysis requires one more reconstruction computer than the post-reconstruction analysis.

Various approaches have been used for decomposition of the input projection data $P_L$ and $P_H$ into Compton projections $A_c$ and photoelectric projections $A_p$. For example, the AMA method approximates $P_L$ and $P_H$ using polynomial functions in terms of $A_c$ and $A_p$. The coefficients of the polynomial functions are determined through a calibration procedure as follows. By measuring the projection values of the combination of various thicknesses of two known materials, the coefficients can be calculated through a polynomial least squares fitting between the measured and modeled $P_L$ and $P_H$. Once the coefficients of the polynomial functions are determined, the decomposition of the Compton and Photoelectric projections $A_c$ and $A_p$ from projections $P_L$ and $P_H$ is usually solved using the Newton-Raphson method.

Another prior art method of performing decomposition is the *direct approximation method*, discussed in L. A. Lehmann, R. E. Alvarez, A. Macovski, W. R. Brody, N. J. Pelc, S. J. Riederer, and A. L. Hall, *Generalized Image Combinations In Dual KVP Digital Radiography*, Med. Phys. 8, 659–667 (1981). In the direct approximation method, $A_c$ and $A_p$ are approximated as polynomial functions in terms of $P_L$ and $P_H$. The coefficients of the polynomial functions in the direct approximation method are determined through a calibration procedure by measuring the projection values of the combination of various thicknesses of two known materials.

In yet another prior art method, decomposition is accomplished using iso-transmission lines, described K. Chuang and H. K. Huang, *A Fast Dual-Energy Computational Method Using Isotransmission Lines and Tables*, Med. Phys. 14, 186–192 (1987). According to this method, for a given projection value, an iso-transmission line is represented by a linear equation in two basis functions. The iso-transmission line method requires a large amount of calibration data.

Further, the iso-transmission line becomes increasingly nonlinear as the projection value increases. In such a situation, the linear equations are not valid and the method causes large approximation errors.

CT images and Z (effective atomic number) images can be generated from both the pre-reconstruction and post-reconstruction analysis. The CT images measure the CT number of scanned materials, which approximates the density of the materials; and the Z image measures the effective atomic number of the scanned materials. The measurements of CT number and Z are used for automatic explosive detection. However the measurements vary over time on a scanner due to HVPS (High Voltage Power System) drifts and vary across scanners due to the components variations in the x-ray beam lines. Such measurement variations interfere with the automatic detection of explosives, resulting in a degraded detection rate and/or an increased false alarm rate.

The cause of the voltage drift in the HVPS is due to the nonlinear thermal effect of some of its components in the feedback control loop. This results in inaccurate measurements of the HVPS output voltages in its feedback control circuit. In other words, the measurements of the HVPS output voltages using its internal circuit do not reflect the actual output voltages.

The HVPS described in U.S. Pat. No. 5,661,774, entitled "Improved Dual Energy Power Supply," assigned to the present assignee and incorporated herein by reference, generates a high-energy voltage and low-energy voltage in alternating views by superimposing a AC (alternating current) voltage on a DC (direct current) voltage. Therefore the generated high-energy voltage and low-energy voltage are coupled functions of the DC and AC voltages: the changes in the DC voltage only, the AC voltage only, or both DC and AC voltages, result in the changes of both high-energy and low-energy X-ray spectra.

In U.S. Pat. No. 6,748,043 by John M. Dobbs assigned to the present assignee and incorporated herein by reference, a KV-meter is used to stabilize the CT numbers in a single-energy CT scanner. The KV-meter includes a principal detector and an auxiliary detector. The auxiliary detector is covered with an absorber that removes a large fraction of the lower-energy X-ray photons in the incident X-ray beam. The ratio between the X-ray intensities measured by the principal and auxiliary detectors is used as a reference for stabilizing the HVPS's voltage, hence the measured CT numbers. However, the method is not directly applicable to the dual-energy HVPS, since the high-energy voltage or low-energy X-ray spectrum is determined by both the DC voltage and AC voltage, not by the DC voltage or AC voltage alone.

In U.S. application Ser. No. 10/899,775, filed on Jul. 17, 2004, by Ram Naidu, et al., entitled "Method of and apparatus for X-ray spectral correction in multi-energy computed tomography," and assigned to the present assignee and incorporated herein by reference, an X-ray spectral correction method using a copper filter mounted on one of the corner of the two-dimensional detector array is used to compensate the Z images and CT images for the HVPS drift and the scanner beamline variation. A block diagram for describing such a system is illustrated in FIG. 6, which can be used with a scanner of the type depicted in FIGS. 1–3. Pre-determined DC voltage $V_{DC}$ and AC voltage $V_{AC}$ are commanded into HVPS 136, which in turn applies its output to X-ray tube 128, the latter yielding X-ray beam(s) of both desired high-energy and low-energy X-ray spectra. The detector array 130 with a mounted copper filter converts the X-ray intensities, which are attenuated by the scanned objects inside the scanner, into corresponding current. DAS 134 then integrates and digitizes the measured current into a scaled version of the X-ray photon energy. The DAS outputs are then used by the dual-energy decomposition and reconstruction system 301 to generate high-energy CT and Z (effective atomic number) images. Spectral correction 310 then compensates and outputs the CT images $I_H$ and Z images $I_Z$ for the spectral variation inferred from the measured copper ratios. However, the method uses a first-order Taylor series expansion approximation, and can only track and compensate for the HVPS voltage drifts which are less than some range, e.g., 10%. When the HVPS voltage drifts are outside such a range, the method yields large errors in the estimates of CT numbers and effective atomic numbers of scanned materials.

SUMMARY OF THE DISCLOSURE

In accordance with one aspect of the disclosure, an algorithm for stabilizing HVPS DC and AC voltages in multi-energy X-ray computed tomography is provided. In one embodiment of the disclosure, the algorithm uses a copper filter mounted on the detector array for tracking the change of HVPS voltages. The detectors under the copper filter receive different X-ray spectra from those not shielded by the copper filter. The ratio of the averaged X-ray intensity received by the copper shielded detectors at high energy views to that received at low energy views is hereinafter called the copper ratio. The ratio of the averaged X-ray intensity received by detectors without copper shielding at high energy views to that received at low energy views is hereinafter called the air ratio. In accordance with one aspect of the disclosure, the air ratio and the copper ratio are used to track the change of X-ray spectra of a scanner, hence the changes of the HVPS output voltages.

In accordance with one aspect of the disclosure, the air ratio and copper ratio are used to compute the HVPS DC and AC voltages. In one embodiment, the computed DC voltage is compared with the commanded DC voltage, and the difference is then fed into an integrator. The integrated error multiplied by a pre-determined constant is then added to the commanded DC voltage as the input DC voltage to the HVPS. Similarly, the computed AC voltage is compared with the commanded AC voltage, and the difference is then fed into an integrator. The integrated error multiplied with another pre-determined constant is then added to the commanded AC voltage as the input AC voltage to the HVPS. In such a system, the HVPS DC and AC voltages are stabilized by the feedback control loop with the integration of the difference between the output voltages and commanded voltages.

In accordance with one aspect of the disclosure, the generated air ratio and copper ratio are used to compute the HVPS DC voltage and AC voltage. Computing the HVPS DC and AC voltages include computing an m-ratio and an n-ratio. The m-ratio is the ratio of the AC voltage to the DC voltage raised by an exponent parameter m; the n-ratio is the ratio of the AC voltage to the DC voltage raised by an exponent parameter n. Both m and n are determined during a calibration procedure. In one embodiment, the third order polynomial functions are used to model the relationship between the m-ratio and the air ratio, and the relationship between the n-ratio and the copper ratio. Other order polynomial functions can also be used.

In accordance with one aspect of the disclosure, a calibration procedure is provided to produce necessary parameters for computing the HVPS DC and AC voltages. The produced parameters include air parameters and copper parameters. The air parameters include an exponent parameter m and a set of polynomial coefficients; the copper parameters include an exponent parameter n and a set of polynomial coefficients.

In one embodiment, the calibration procedure includes scanning at different pairs of DC and AC voltages. The air ratios and copper ratios for each pair of DC and AC voltages are generated. In another embodiment, the air parameters are determined by the air ratios and the corresponding DC and AC voltages. The copper parameters are determined by the copper ratios and the corresponding DC and AC voltages. In another embodiment, the optimal air parameters and copper parameters are the solution to a nonlinear least square minimization function. In one embodiment solving the air parameters or copper parameters includes a brute force search over the exponent parameter and closed form solution of the polynomial coefficients.

A system for stabilizing the HVPS DC and AC voltages in multi-energy X-ray computed tomography scanners is also disclosed. The system includes modules configured to implement the above functionality. The system may include a copper filter mounted on the detector array, a module for calculating air ratios and copper ratios, a module for computing DC and AC voltages, a module for comparing the computed voltages and commanded voltages, a module for integrating the difference between the computed voltages and commanded voltages, and a module for adding the integrated values to the commanded voltages. The system may also include a module for performing the calibration as described above.

While this disclosure has been particularly shown and described with references to preferred embodiments thereof, it will be understood by those skilled in the art that various changes in form and details may be made therein without departing from the spirit and scope of the disclosure as defined by the following claims.

BRIEF DESCRIPTION OF THE DRAWINGS

The drawing figures depict preferred embodiments by way of example, not by way of limitations. In the figures, like reference numerals refer to the same or similar elements.

FIG. 12 contains an example of pairs of HVPS DC and AC voltages used in the calibration procedure of the present disclosure.

DETAILED DESCRIPTION OF THE PREFERRED EMBODIMENTS

I. Feedback Control of HVPS Voltages

Figure 1:
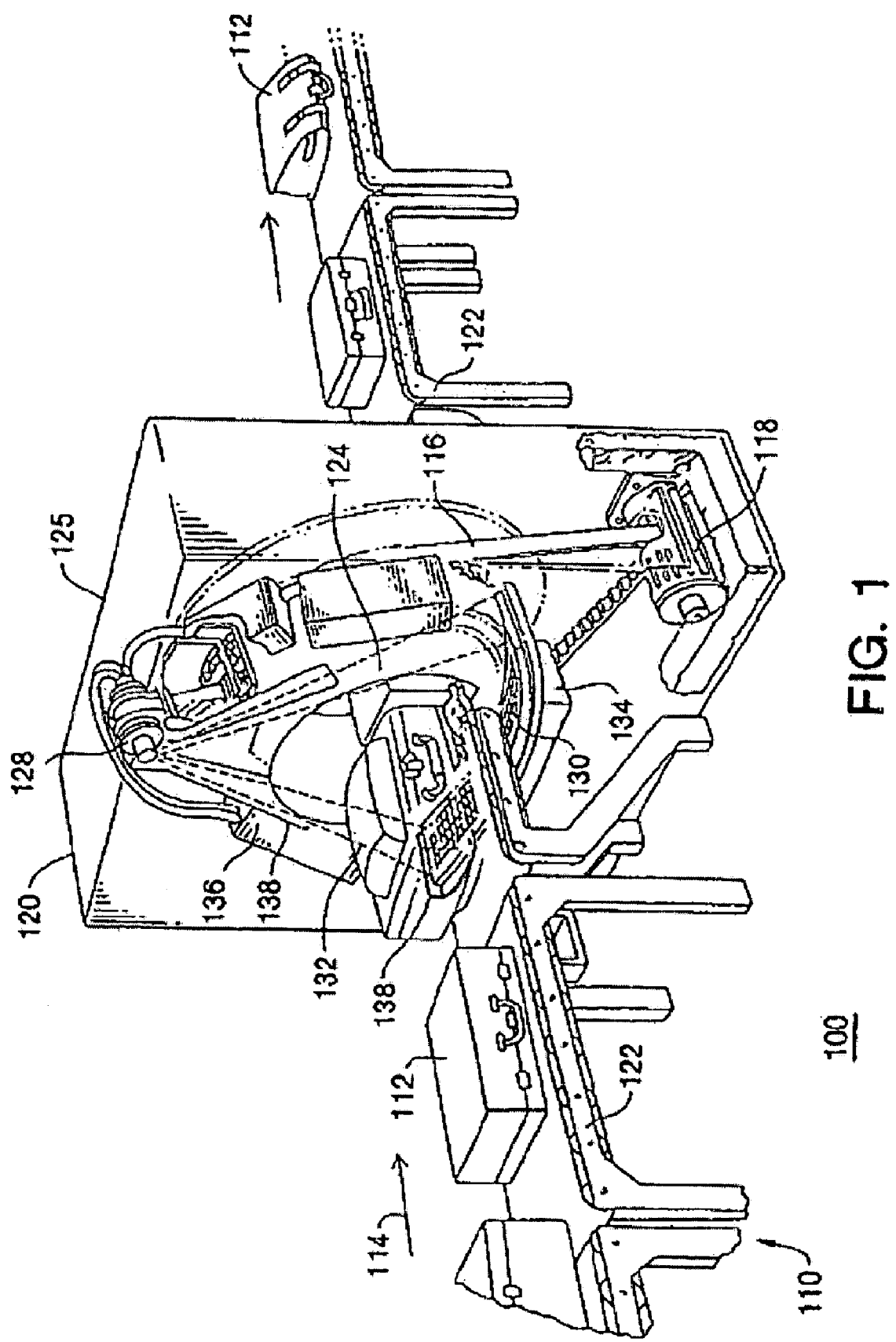
FIG. 1 is a perspective view of a baggage scanning system, known in the prior art.
Figure 2:
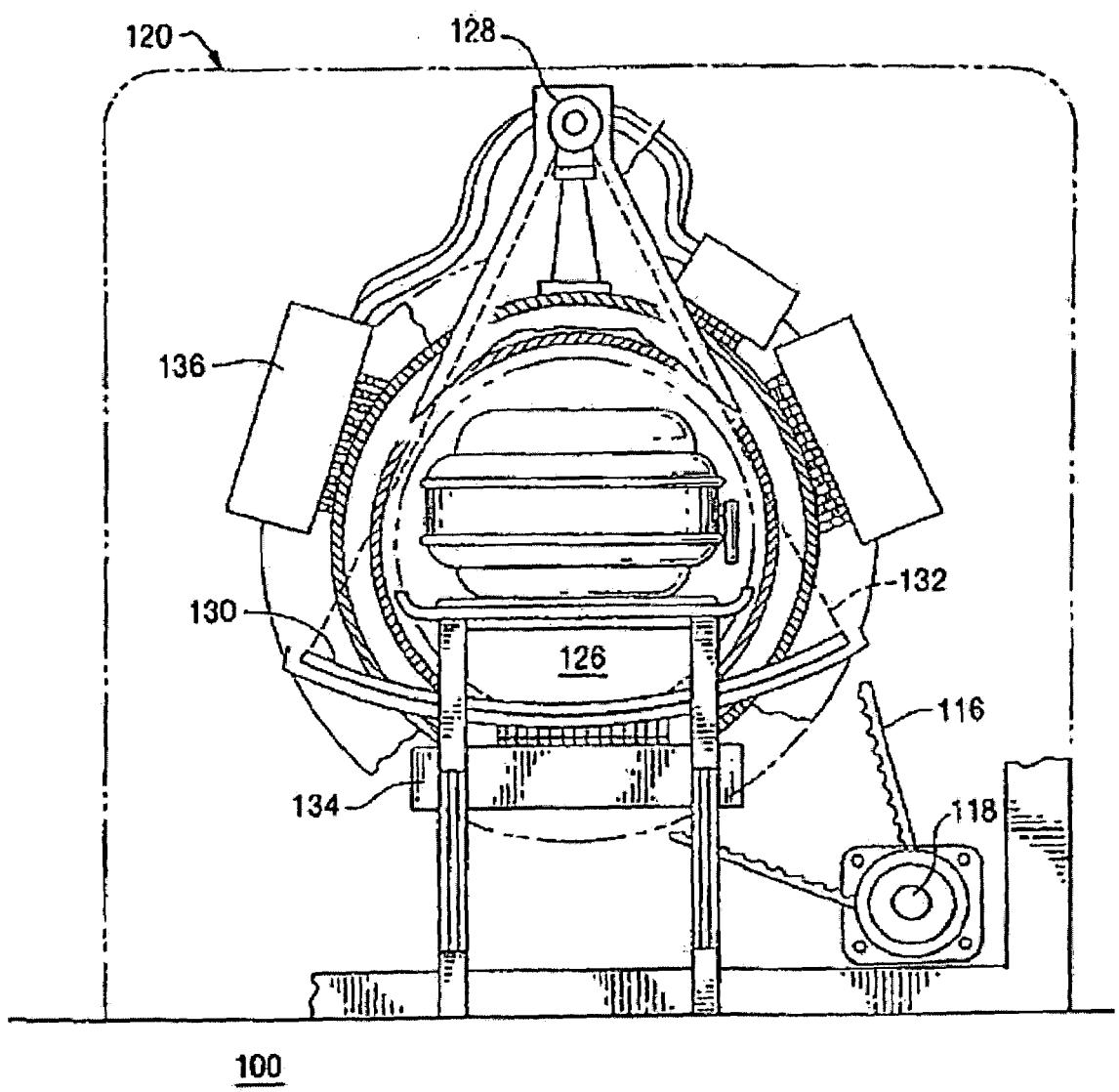
FIG. 2 is a cross-sectional end view of the system of FIG. 1.
Figure 3:
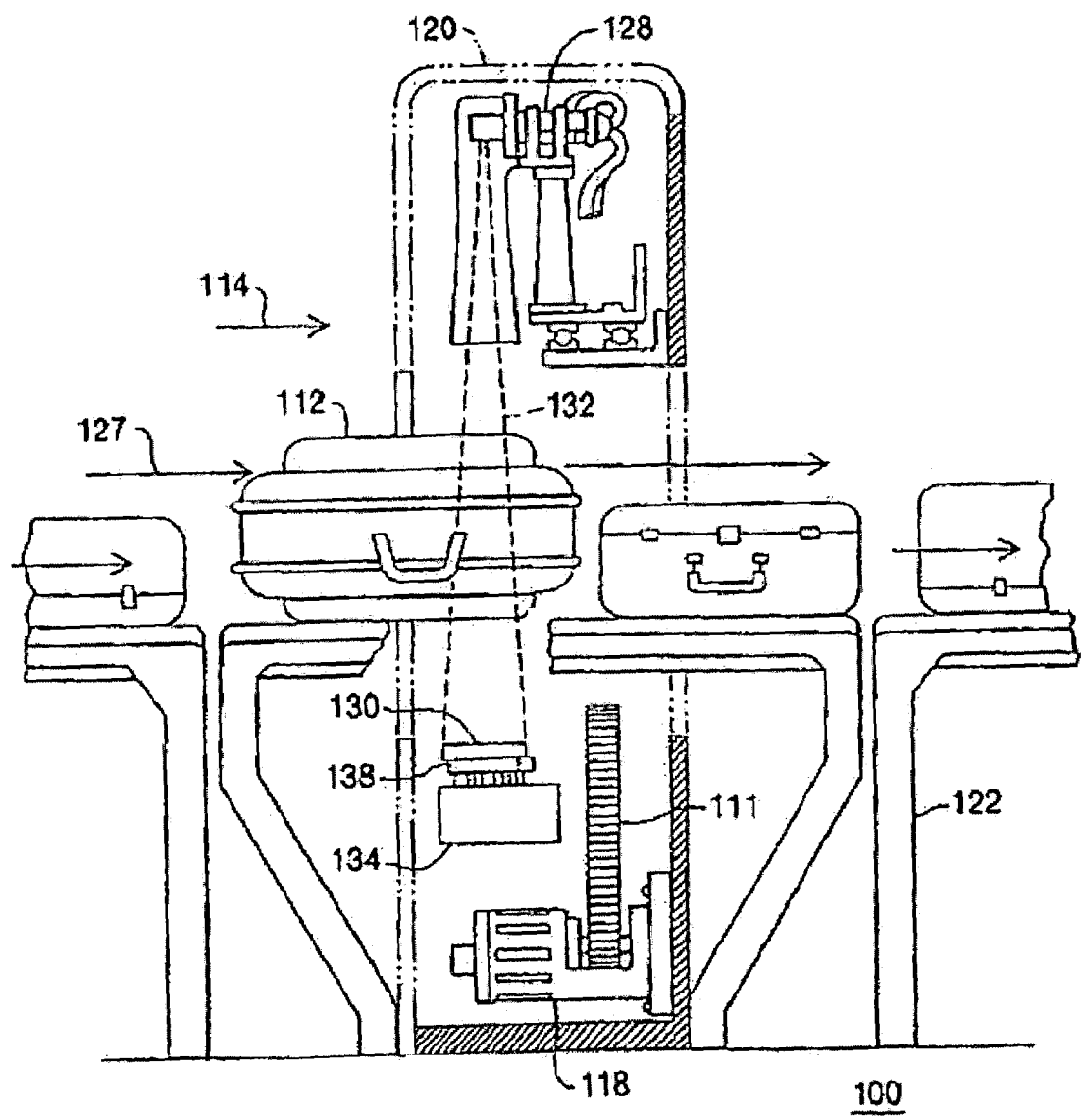
FIG. 3 is a cross-sectional radial view of the system of FIG. 1.
Figure 4:
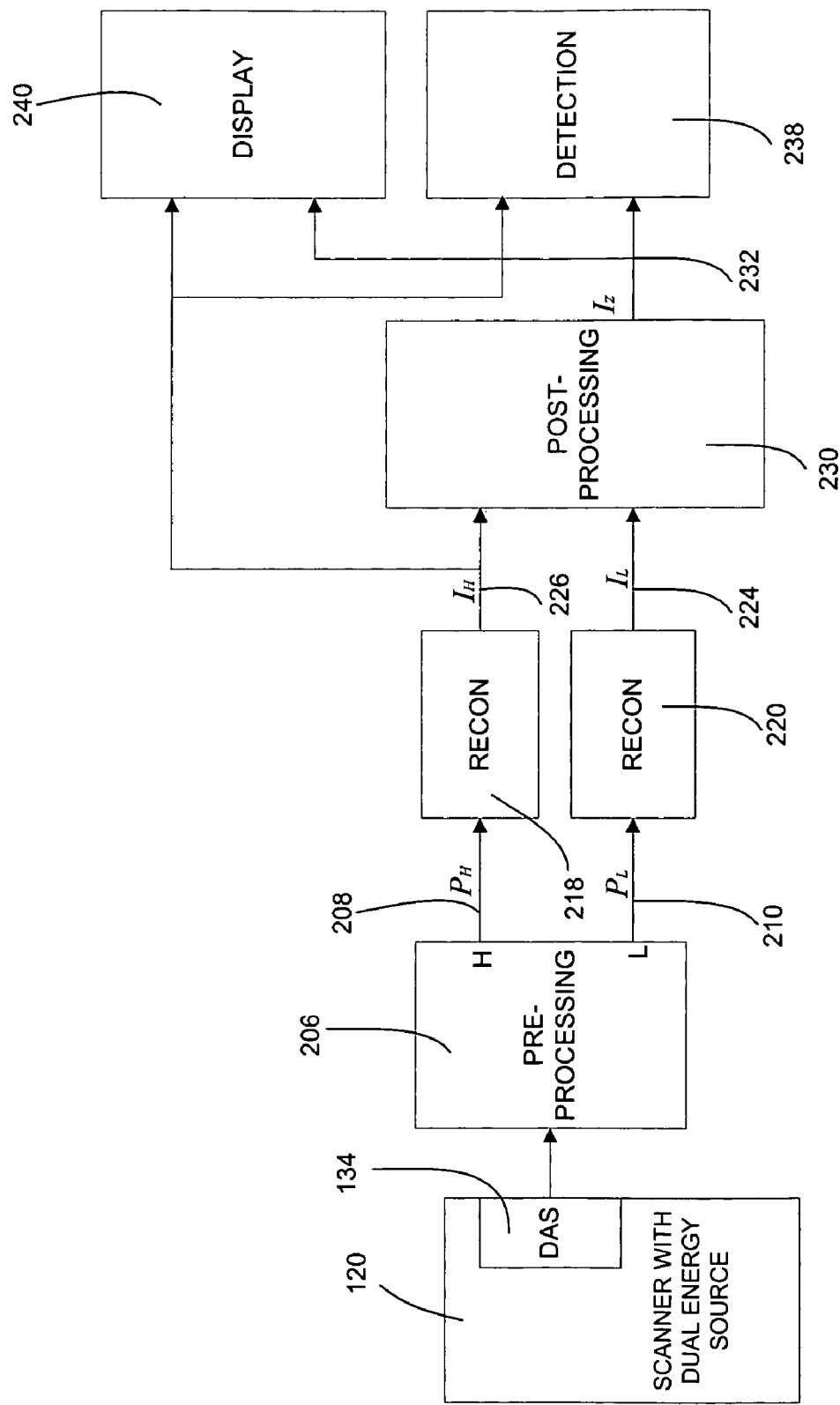
FIG. 4 is a signal flow diagram of a system capable of performing post-reconstruction analysis, useful in the system of FIG. 1.
Figure 5:
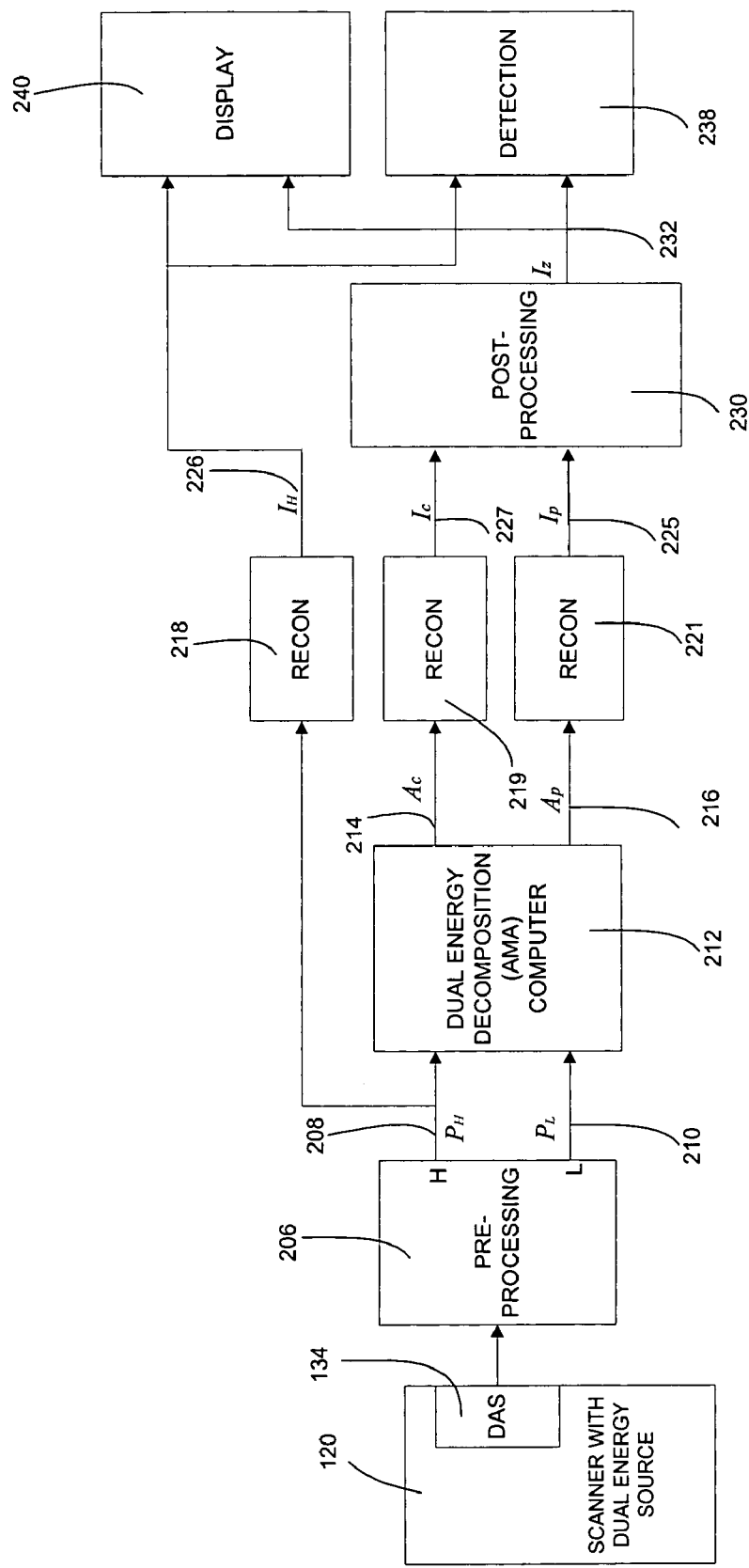
FIG. 5 is a signal flow diagram of a system capable of performing pre-reconstruction analysis, useful in the system of FIG. 1.
Figure 6:
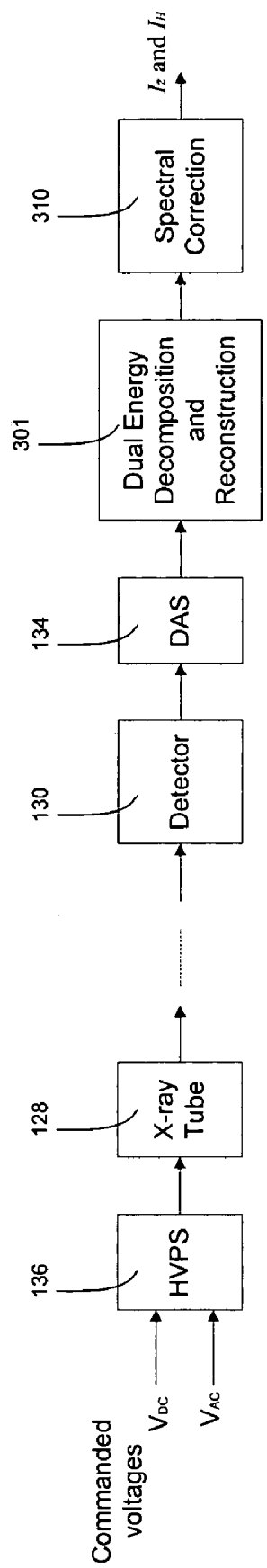
FIG. 6 is a signal flow diagram of a system controlling HVPS voltages, known in the prior art.

In accordance with the present disclosure, a preferred algorithm for stabilizing HVPS output voltages for dual-energy CT scanners is provided. The X-ray tube generates beam(s) of the high-energy and low-energy X-ray spectra, which are determined by the DC (Direct Current) and AC (Alternating Current) voltages supplied by the HVPS (High Voltage Power Supply) to the X-ray tube. The HVPS produces the following voltage, $$V = V_{DC} + V_{AC} \sin(2\pi ft)$$

wherein $V_{DC}$ is the DC voltage, $V_{AC}$ is the AC voltage (more accurately the magnitude of the AC voltage, but for simplification the AC voltage is hereinafter referred to as $V_{AC}$), and f is the frequency of the AC voltage, the latter being equal to the product of the disk rotational speed and number of views per rotation. The DC voltage and AC voltage are optimally chosen so that the reconstructed Z image yields the highest SNR (Signal to Noise Ratio). For example, in the assignee's commercial scanner system similar to the one shown in connection with FIGS. 1–3, the DC voltage is set to 140 kV, and the AC voltage magnitude is set to 40 kV. However, the HVPS drifts in both DC and AC voltages when in operation, resulting in variations of measured CT numbers and effective atomic numbers of scanned materials.

Figure 7:
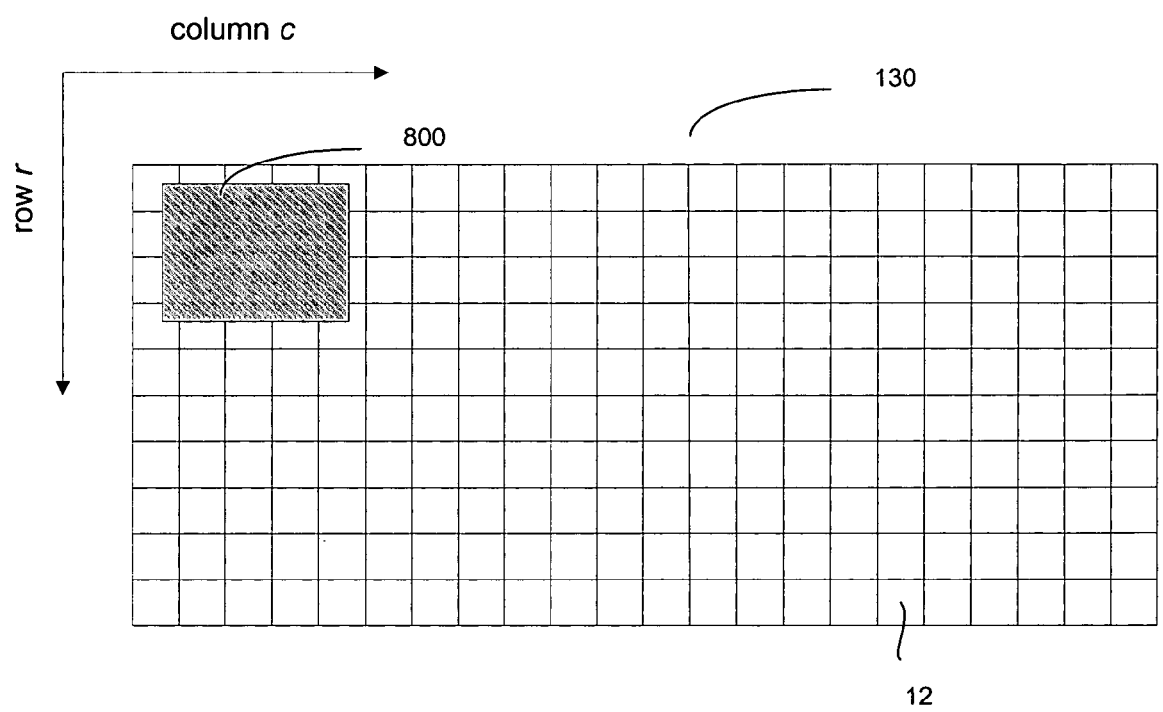
FIG. 7 illustrates a detector array with a copper filter of the present disclosure.
Figure 8:
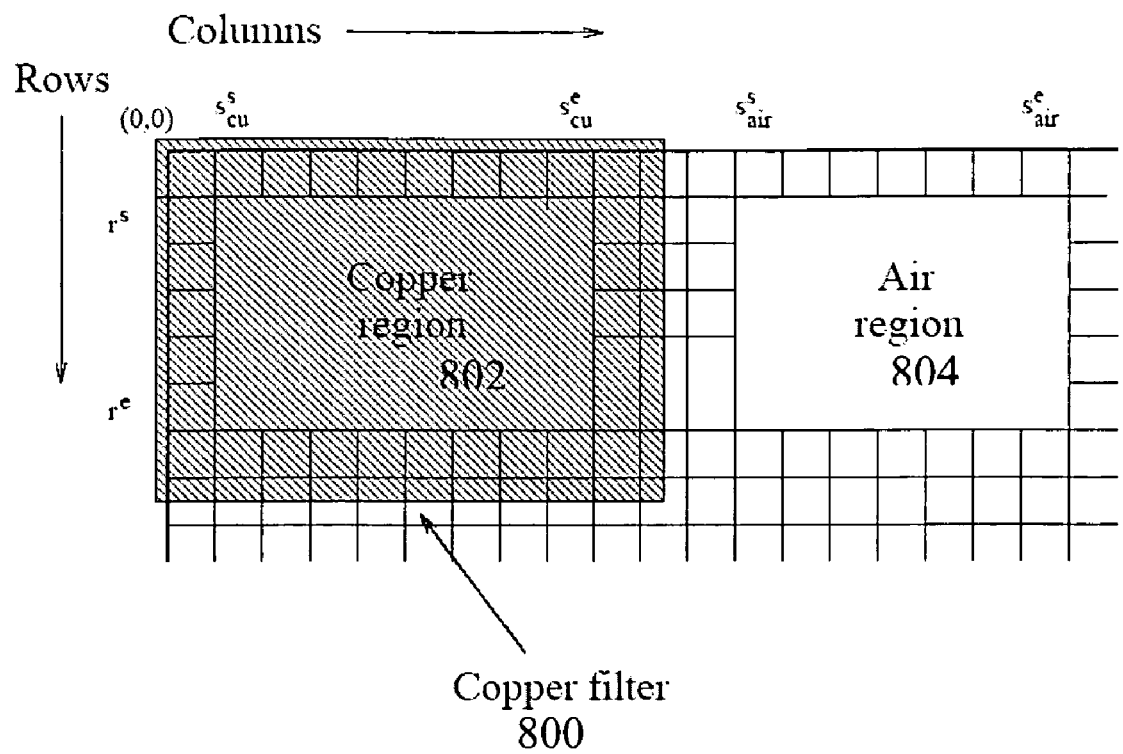
FIG. 8 illustrates the row indices and column indices of the detectors used for computing copper ratios and air ratios of the present disclosure.

FIG. 7 shows a detector array 130 comprising a two-dimensional matrix of detectors, each individual detector being denoted at 12. A rectangular copper filter 800, for example, 69 mm long, 22 mm wide, 0.43 mm thick, is mounted relative to, and more particularly in front of a portion of the two-dimensional array, e.g., over the upper left corner of the two-dimensional detector array. Thus, as shown in FIG. 8, some of the detectors 802 are shielded by the copper filter, and others of the detectors 804 are not shielded by the copper filter. The starting row index of detectors 802 is indicated as $r^s$, the ending row index is indicated as $r^e$, the starting column index is indicated as $s_{cu}^s$, and the ending column index is indicated as $s_{cu}^e$. For the detectors 804, in the example described, the starting and ending row indices are the same as the detectors 802 (although the detectors in the array can be used); the starting column index is indicated as $s_{air}^s$, and the ending column index is indicated as $s_{air}^e$.

The copper filter 800 is preferably mounted in front of detectors where received data is not required to be used for image reconstruction during a scan. For example, one such location is in the upper left corner of the whole detector array. In this example, data are preferably reconstructed using the Nutating Slice Reconstruction algorithm as described in the assignee's U.S. Pat. No. 5,802,134 (Greg Larson et al.), the algorithm does not require data from the upper left corner of the array for reconstruction. Therefore, the placement of the copper filter in the upper left corner does not affect the quality of the reconstructed images.

Figure 9:
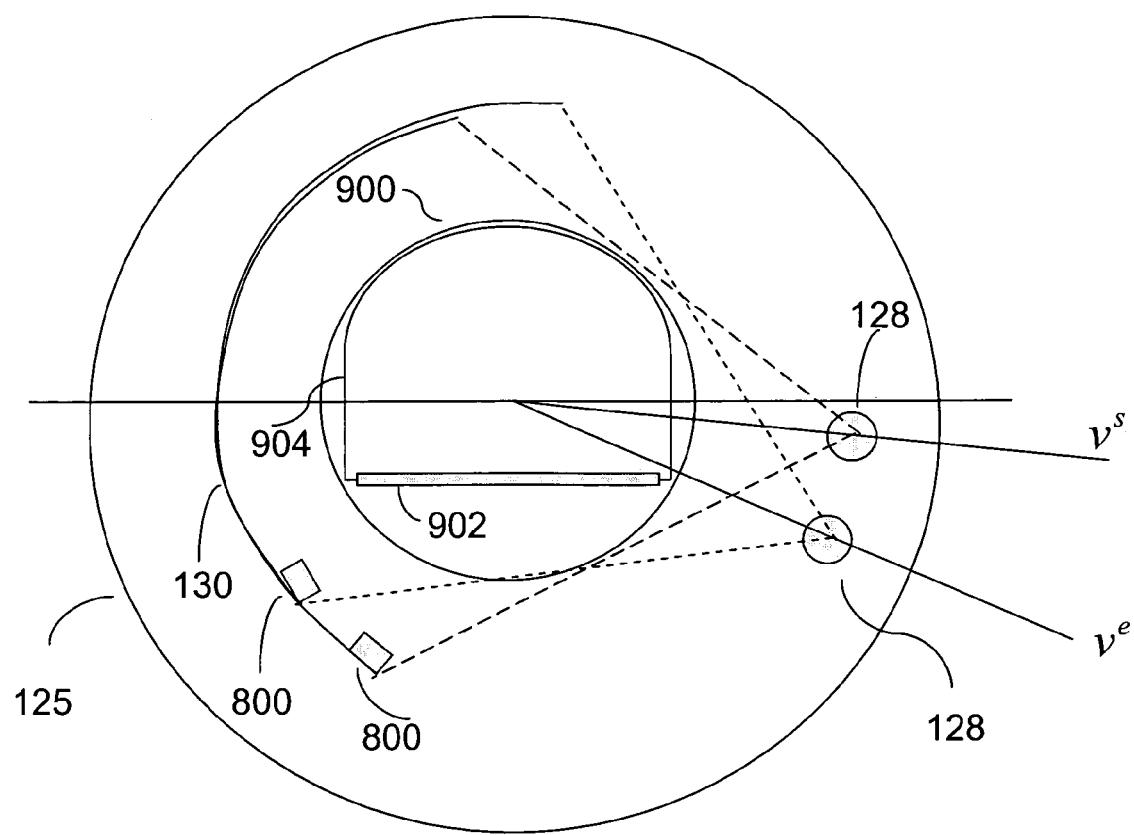
FIG. 9 illustrates the starting view angle and ending view angle for computing copper ratios and air ratios of the present disclosure.

FIG. 9 illustrates the range of view angles at which the detectors shielded by the copper filter receive X-ray beams not blocked by the conveyor belt 902. In FIG. 9, 900 designates a reconstruction circle, and 904 is the scanner tunnel. The range of the view angles is arbitrarily (?) determined by a starting view angle $v^s$ and an ending view angle $v^e$. (?)

The detectors under the copper filter receive different X-ray spectra than those not shielded by the copper filter. The ratios of the averaged X-ray intensity received by the copper shielded detectors at high energy views to that received at low energy views is called the copper ratio. The ratios of the averaged X-ray intensity received by detectors without copper shielding at high energy views to that received at low energy views is called the air ratio. In accordance with one aspect of the disclosure, the air ratio and the copper ratio are used to track the change of X-ray spectra of a scanner, hence the changes of the HVPS output voltages.

Figure 10:
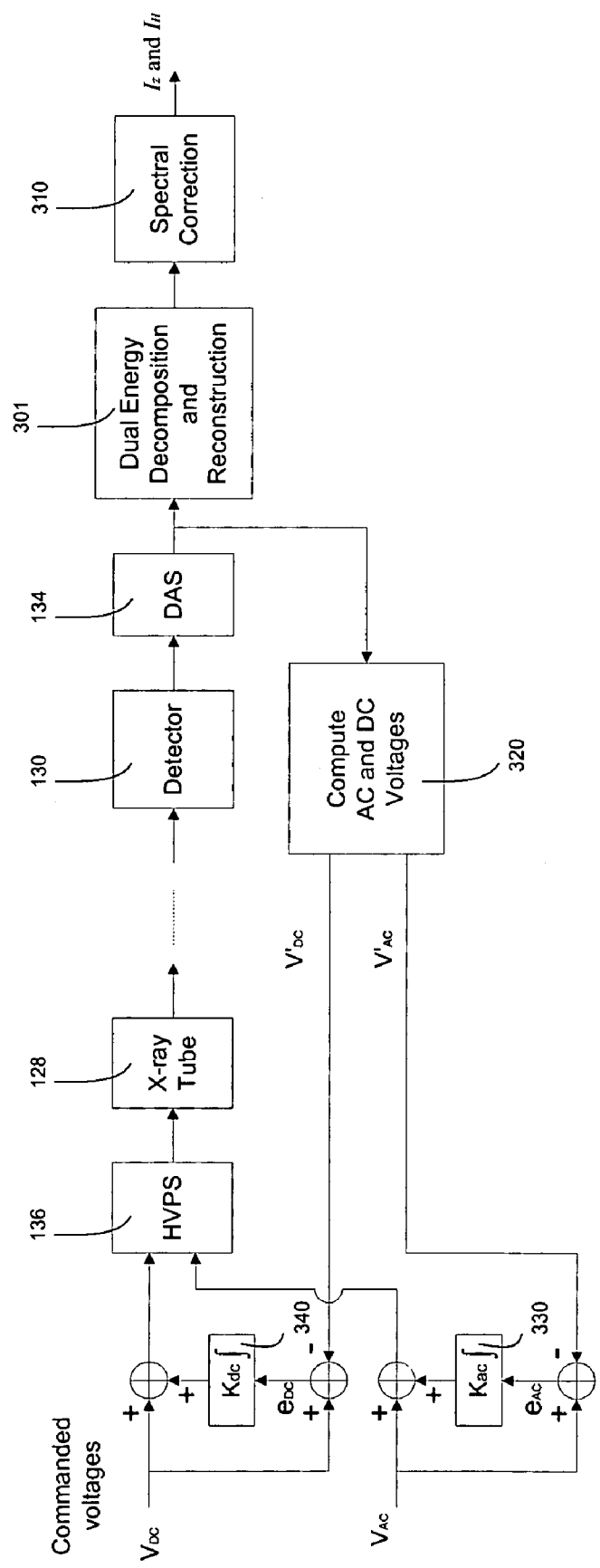
FIG. 10 contains a partial block diagram and partial flow diagram of one embodiment of a system for stabilizing the HVPS DC and AC voltages of the present disclosure.

FIG. 10 illustrates a top level diagram of signal and date flow of the preferred algorithm for stabilizing the HVPS output voltages. The DAS 134 outputs the X-ray intensities to unit 320, which computes the air ratios and copper ratios, and computes the HVPS output DC and AC voltages. The computed DC voltage $V'_{DC}$ is compared with the commanded DC voltage $V_{DC}$, and the difference $e_{DC}$ is then fed into an integrator 340. The pre-determined constant $K_{DC}$ is experimentally determined, and is usually between 0 and 1. The integrated DC voltage error $K_{DC} \int e_{DC} dt$ is then added to the commanded voltage $V_{DC}$ as the input DC voltage to the HVPS. Similarly, the computed AC voltage $V'_{AC}$ is compared with the commanded AC voltage $V_{AC}$, and the difference $e_{AC}$ is then fed into an integrator 330. The pre-determined constant $K_{AC}$ is experimentally determined, and is usually between 0 and 1. The integrated AC voltage error $K_{AC} \int e_{AC} dt$ is then added to the commanded voltage $V_{AC}$ as the input AC voltage to the HVPS. In the above described system, the HVPS voltages are stabilized by the feedback control loop, involving computing the HVPS's output AC and DC voltages as a function of the air ratio and the copper ratio, which is elaborated in more detail in the next section.

II. Computing $V'_{DC}$ and $V'_{AC}$

In accordance with the present disclosure, a preferred algorithm for computing the HVPS output DC and AC voltages is also provided. The calculation of the HVPS output DC and AC voltages is based on a preferred nonlinear model, which relates the measured air ratio and copper ratio to the HVPS output DC and AC voltages. The nonlinear model can be described by the following equations:

$$R_{air} = 1 + a_1 \frac{V'_{AC}}{V'^m_{DC}} + a_2 \left(\frac{V'_{AC}}{V'^m_{DC}}\right)^2 + a_3 \left(\frac{V'_{AC}}{V'^m_{DC}}\right)^3 \quad (a)$$

$$R_{cu} = 1 + c_1 \frac{V'_{AC}}{V'^m_{DC}} + c_2 \left(\frac{V'_{AC}}{V'^m_{DC}}\right)^2 + c_3 \left(\frac{V'_{AC}}{V'^m_{DC}}\right)^3 \quad (b)$$

where $R_{air}$ is the air ratio, $R_{cu}$ is the copper ratio, $V'_{DC}$ is the HVPS DC voltage, $V'_{AC}$ is the HVPS AC voltage, m and $a_1$, $a_2$, $a_3$ are air parameters, and n and $c_1$, $c_2$, $c_3$ are copper parameters. Both the air parameters and the copper parameters are determined for each scanner during a calibration procedure, which is described in detail in next section. Note that $$\frac{V'_{AC}}{V'^m_{DC}}$$

is called the m-ratio and $$\frac{V'_{AC}}{V'^n_{DC}}$$

is called the n-ratio.

The algorithm for computing the HVPS DC and AC voltages preferably comprises the following steps:
  Generating the air ratios and the copper ratios;
  Computing the m-ratio and the n-ratio;
  Calculating DC and AC voltages.

Figure 11:
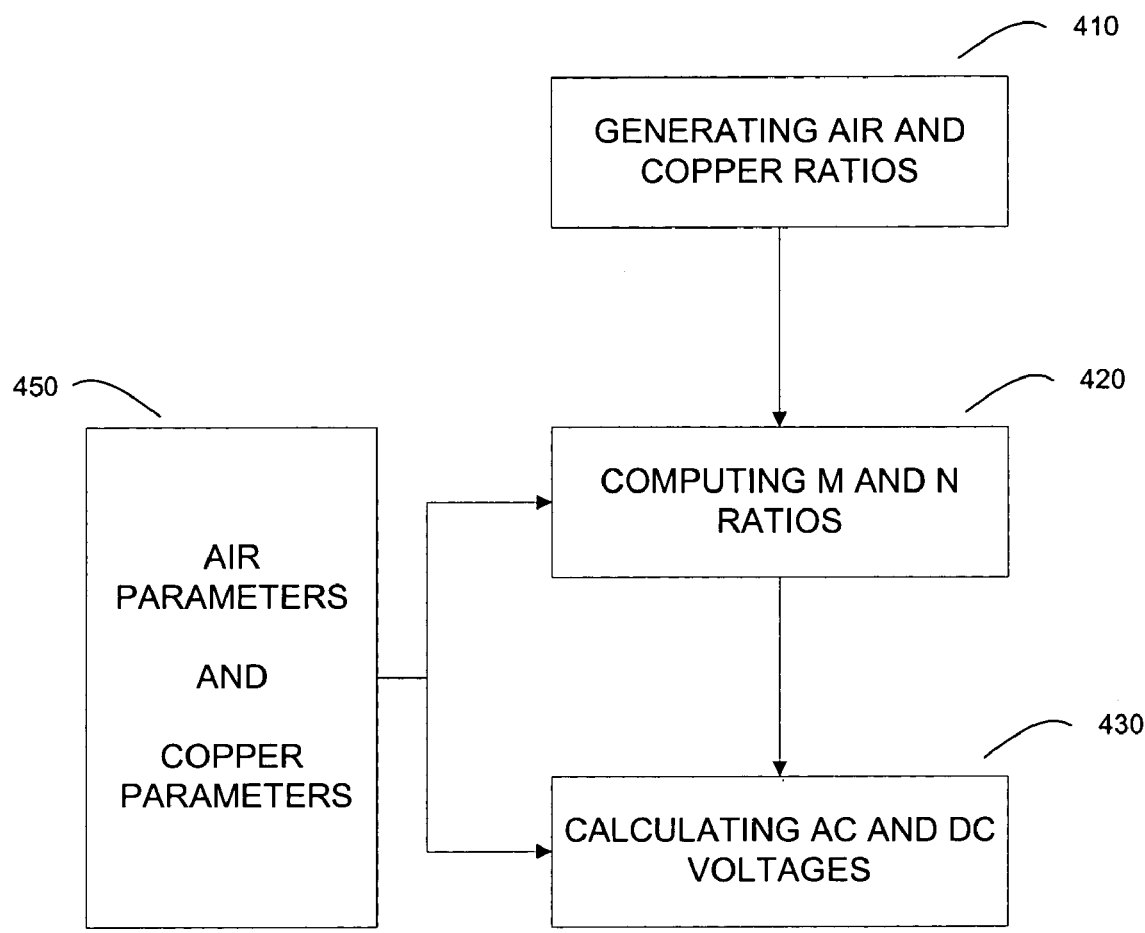
FIG. 11 contains a flow diagram which illustrates the logical flow of one embodiment for computing HVPS DC and AC voltages of the present disclosure.

FIG. 11 contains a flow chart of the correction algorithm, illustrating the above listed steps. At Step 410, copper ratios are calculated from the DAS outputs as follows. Denote $P_{off}(s,r)$ as the offset value of the detector s at row r of the two-dimensional detector array. The size of the two-dimensional detector array is R rows by S columns. As an example, in the assignee's commercial scanner system similar to the one illustrated in connection with FIGS. 1–3, R=24 and S=252. The offset table $P_{off}(s,r)$ of all the detectors in the two-dimensional array is collected when the X-rays are turned off.

Still at Step 410, denote $P_{DAS}(v,s,r)$ as a detector reading of the X-ray intensity value at detector s at row r of the two-dimensional detector array and at view v. An offset correction is performed as follows so that the detector readings correspond to zero when there are no X-rays, $$P_o(v,s,r) = P_{DAS}(v,s,r) - P_{off}(s,r)$$

where $P_o$ (v,s,r) is the offset corrected detector reading.

The offset corrected detector readings are then used to compute the average copper readings and average air readings. Denote $\overline{P}_{air}^h$ as the average high-energy air counts, $\overline{P}_{air}^l$ as the average low-energy air counts, $\overline{P}_{cu}^h$ as the average high-energy copper counts, $\overline{P}_{cu}^l$ as the average low-energy copper counts. $\overline{P}_{air}^h$, $\overline{P}_{air}^l$, $\overline{P}_{cu}^h$, and $\overline{P}_{cu}^l$ are computed as follows, $$\overline{P}_{air}^h = K_{air} \sum_{v \in \{v^s \leq v \leq v^e, \text{ and } v \text{ is even}\}} \sum_{s=s^s_{air}}^{s^e_{air}} \sum_{r=r^s}^{r^e} P_o(v,s,r)$$

$$\overline{P}_{air}^l = K_{air} \sum_{v \in \{v^s \leq v \leq v^e, \text{ and } v \text{ is odd}\}} \sum_{s=s^s_{air}}^{s^e_{air}} \sum_{r=r^s}^{r^e} P_o(v,s,r)$$

$$\overline{P}_{cu}^h = K_{cu} \sum_{v \in \{v^s \leq v \leq v^e, \text{ and } v \text{ is even}\}} \sum_{s=s^s_{air}}^{s^e_{air}} \sum_{r=r^s}^{r^e} P_o(v,s,r)$$

$$\overline{P}_{cu}^l = K_{cu} \sum_{v \in \{v^s \leq v \leq v^e, \text{ and } v \text{ is odd}\}} \sum_{s=s^s_{air}}^{s^e_{air}} \sum_{r=r^s}^{r^e} P_o(v,s,r)$$

where $K_{air}$ and $K_{cu}$ are computed as follows, $$K_{air} = \frac{2}{(v^e - v^s + 1)(s^e_{air} - s^s_{air} + 1)(r^e - r^s + 1)}$$

$$K_{cu} = \frac{2}{(v^e - v^s + 1)(s^e_{cu} - s^s_{cu} + 1)(r^e - r^s + 1)}$$

Note that the odd view angle v corresponds to those employing the low-energy X-ray spectrum, and even view angle v corresponds to those employing the high-energy X-ray spectrum.

Still at Step 410, the averaged air counts and copper counts are used to calculate the air ratio and the copper ratio. $R_{air}$ is denoted as the air ratio, and $R_{cu}$ is denoted as the copper ratio. They are calculated as follows, $$R_{air} = \frac{\overline{P}^h_{air}}{\overline{P}^l_{air}}$$

$$R_{cu} = \frac{\overline{P}^h_{cu}}{\overline{P}^l_{cu}}$$

As discussed before, the air ratio and the copper ratio computed for the high-energy and low-energy X-ray spectra are fixed for a given beamline of a scanner, and a pair of DC and AC voltages applied to the X-ray tube. Therefore, changes in the air and copper ratios reflect the changes in the X-ray spectra of a scanner, hence the HVPS DC and AC voltages.

In computing the DC and AC voltages, the m-ratio, denoted as $$R_m = \frac{V'_{AC}}{V'^m_{DC}},$$

and the n-ratio, denoted as $$R_n = \frac{V'_{AC}}{V'^m_{DC}},$$

are first calculated from Eqs. (a) and (b), which are re-written as follows, $$R_{air} = a_3 R_m^3 + a_2 R_m^2 + a_1 R_m + 1 \quad (c)$$

$$R_{cu} = c_3 R_n^3 + c_2 R_n^2 + c_1 R_n + 1 \quad (d)$$

Note that the air parameters m and $a_i$ for i=1, 2, 3 and copper parameters n and $c_i$ for i=1, 2, 3 are obtained through a calibration procedure, which will be described later. In Step 420, the m-ratio $R_m$ and the n-ratio $R_n$ are computed by finding positive real roots of the cubic equations Eqs. (c) and (d). The numerical algorithm for finding the roots of polynomial functions can be found in "Numerical Recipes in C" by William H. Press and et al, published by Cambridge University Press in 1992.

At Step 430, the DC and AC voltages are finally calculated from the m-ratio $R_m$ and the n-ratio $R_n$ as follows.

$$V'_{DC} = \left(\frac{R_m}{R_n}\right)^{1/(n-m)}$$

$$V'_{AC} = R_m V'^m_{DC}$$

Note that the air ratios and the copper ratios are computed at every rotation, the DC and AC voltages can be computed at every rotation for feedback.

III. Calibration

Regarding 450, the calibration procedure described here is to obtain the air parameters m, $a_i$ for i=1, 2, 3, copper parameters n and $c_i$ for i=1, 2, 3 for computing the HVPS output DC and AC voltages.

The first step in the calibration procedure is to acquire necessary data for computing the air parameters and copper parameters. During the data acquisition, the scanner is operated at different combinations of DC and AC voltages. For each pair of DC and AC voltage, the air ratio and copper ratio are computed as described in the previous section. $\tilde{V}_{DC}(k)$ and $\tilde{V}_{AC}(k)$ are denoted as the pair of HVPS DC and AC voltages at the k th measurement, and $\tilde{R}_{air}(k)$ and $\tilde{R}_{cu}(k)$ are the corresponding air ratio and copper ratio. The number of total measurements is denoted as $N_k$. The minimum value of $N_k$ is four, however, it is better to obtain additional measurements to yield robust parameters. In the example of assignee's scanner system of the type described in connection with FIGS. 1–3, $N_k$=12 yields satisfactory results. The combination of $\tilde{V}_{DC}(k)$ and $\tilde{V}_{AC}(k)$ for each measurement is arbitrary as long as there are no duplicates in the total $N_k$ measurements. For example, the combinations shown in FIG. 12 are used in the assignee's scanner system, and yield satisfactory results.

Note that air parameters m, $a_i$ for i=1, 2, 3 are determined by the air ratios only, and the copper parameters n, $c_i$ for i=1, 2, 3 are determined by the copper ratios only. The procedures for computing the air parameters m, $a_i$ for i=1, 2, 3 and the copper parameters n, $c_i$ for i=1, 2, 3 are the same. For the simplicity of the exposition, only the calculation of the air parameters m, $a_i$ for i=1, 2, 3 are described in detail below.

The following steps are used to calculate the air parameters m, $a_i$ for i=1, 2, 3. For the convenience of the notation, the vector $a=[a_1,a_2,a_3]^T$ is used. The nonlinear least square fitting for finding the optimal air parameters m* and a* is used. The nonlinear least square fitting can be described mathematically using the following equation:

$$<m^*, a^*> = \arg\min_{<m,a>} d(m, a) \text{ where}$$

$$d(m, a) = \sum_{k=0}^{N_k-1} \left[1 + a_1 \frac{\tilde{V}_{AC}(k)}{\tilde{V}^m_{DC}(k)} + a_2 \left(\frac{\tilde{V}_{AC}(k)}{\tilde{V}^m_{DC}(k)}\right)^2 + a_3 \left(\frac{\tilde{V}_{AC}(k)}{\tilde{V}^m_{DC}(k)}\right)^3 - \tilde{R}_{air}\right]^2$$

For a given value of m, there is a closed form solution of the polynomial coefficients $a=[a_1,a_2,a_3]^T$. Therefore, a brute force search over the possible value of m coupled with the closed form solution of the polynomial coefficients $a=[a^1, a_2,a_3]^T$ is used to solve the above nonlinear minimization problem. The details are described in the following:

1) Calculate m(l), l=0, . . . , $N_l$ as follows, $$m(l) = l\delta_{min}$$

where, the values of $\delta_{min}$ and $N_l$ are experimentally determined. For example, $\delta_{min}$=0.001, and $N_l$=2000 yield satisfactory results in the assignee's scanner system in connection with FIGS. 1–3.

2) For each m(l), compute the closed form solution of the polynomial coefficients $a=[a_1,a_2,a_3]^T$ as follows, a) Forming the vectors b and x as follows, $$b = [\tilde{R}_{air}(0), \cdots, \tilde{R}_{air}(N_k)]^T$$

$$x = \left[\frac{\tilde{V}_{AC}(0)}{\tilde{V}_{DC}^{m(l)}(0)}, \cdots, \frac{\tilde{V}_{AC}(N_k)}{\tilde{V}_{DC}^{m(l)}(N_k)}\right]^T$$

b) Form the matrix A as follows, $A=[x\ x^2\ x^3]$ c) Compute the closed form least-square solution as follows, $a(l)=(A^TA)^{-1}A^Tb$ 3) Compute the fitting error d(l) as follows, $$d(l) = \sum_{k=0}^{N_k-1}\left[1 + a_1(l)\frac{\tilde{V}_{AC}(k)}{\tilde{V}_{DC}^{m(l)}(k)} + a_2(l)\left(\frac{\tilde{V}_{AC}(k)}{\tilde{V}_{DC}^{m(l)}(k)}\right)^2 + a_3(l)\left(\frac{\tilde{V}_{AC}(k)}{\tilde{V}_{DC}^{m(l)}(k)}\right)^3 - \tilde{R}_{air}\right]^2$$

4) Find l* corresponding to the minimum of d(l) as follows, $l^* = \arg\min_l d(l)$ 5) Then the optimal m* and a* are as follows, $m^*=m(l)$ $a^*=a(l)$ To obtain the copper parameter n and $c_i$ for i=1, 2, 3, the same procedure is performed using the copper ratios.

While this disclosure has been particularly shown and described with references to preferred embodiments thereof, it will be understood by those skilled in the art that various changes in form and details may be made therein without departing from the spirit and scope of the disclosure as defined by the following claims. Such variations include using other material instead of copper as the filter.

The invention claimed is:

1. A method of stabilizing commanded DC and AC voltages supplied by a High Voltage Power Supply (HVPS) in multi-energy X-ray computed tomography using projection data acquired by scanning objects, wherein the projection data include a set of low energy projections and a set of high energy projections using at least two x-ray spectra, wherein a copper filter is mounted relative to at least a portion of a scanner's detector array, comprising:
   A. generating air ratios and copper ratios from said low and high energy projections;
   B. computing voltage ratios from said air ratios and copper ratios;
   C. computing HVPS DC and AC voltages from said voltage ratios;
   D. providing feedback as a function of computed HVPS DC and AC voltages to simultaneously stabilize the commanded HVPS DC and AC voltages.

2. The method of claim 1, wherein part A includes generating air ratios by dividing said low and high energy projections, both measured by at least a portion of the scanner's detector array not covered by said copper filter.

3. The method of claim 1, wherein part A includes generating copper ratios by dividing said low and high energy projections, both measured by at least a portion of the scanner's detector array covered by said copper filter.

4. The method of claim 1, wherein part B for computing voltage ratios includes computing a voltage m-ratio and a voltage n-ratio from said air ratios and said copper ratios.

5. The method of claim 4, wherein part C for computing the HVPS DC and AC voltages includes computing the HVPS DC and AC voltages as a function of the said voltage m-ratio and the said voltage n-ratio.

6. The method of claim 4, further including performing a calibration procedure.

7. The method of claim 6, wherein performing the calibration procedure includes scanning at different DC and AC voltages and measuring low and high energy projections.

8. The method of claim 6, wherein performing the calibration procedure includes computing air parameters from said low and high energy projections and said DC and AC voltages.

9. The method of claim 8, wherein computing the air parameters includes computing an exponent parameter.

10. The method of claim 8, wherein computing the air parameters includes computing a set of polynomial coefficients.

11. The method of claim 8, wherein computing the air parameters includes performing a brute force search over an exponent parameter and a closed form solution of polynomial coefficients.

12. The method of claim 6, wherein performing the calibration procedure includes generating copper parameters from said low and high energy projections and said DC and AC voltages.

13. The method of claim 12, wherein computing the copper parameters includes computing an exponent parameter.

14. The method of claim 12, wherein computing the copper parameters includes computing a set of polynomial coefficients.

15. The method of claim 12, wherein computing copper parameters includes performing a brute force search over an exponent parameter and a closed form solution of polynomial coefficients.

16. The method of claim 1, wherein part D includes comparing the computed voltages with the commanded voltages.

17. The method of claim 1, wherein part D includes integrating differences between the computed voltages and commanded voltages.

18. The method of claim 17, wherein part D includes adding the integrated voltage differences to the commanded voltages.

19. A system for stabilizing commanded DC and AC voltages supplied by a High Voltage Power Supply (HVPS) in multi-energy X-ray computed tomography using projection data acquired by scanning objects, wherein the projection data include a set of low energy projections and a set of high energy projections using at least two x-ray spectra, wherein a copper filter is mounted relative to at least a portion of a scanner's detector array, comprising:
   A. a component constructed and arranged so as to generate air ratios and copper ratios from said low and high energy projections;

B. a component constructed and arranged so as to generate voltage ratios from said air ratios and cooper ratios;

C. a component constructed and arranged so as to compute HVPS DC and AC voltages from said voltage ratios; and D. a component constructed and arranged so as to provide feedback as a function of computed HVPS DC and AC voltages to simultaneously stabilize the commanded HVPS DC and AC voltages.

20. The system of claim 19, wherein Component A generates air ratios by dividing said low and high energy projections, both measured by at least a portion of the scanner's detector array not covered by said copper filter.

21. The system of claim 19, wherein Component A generates copper ratios by dividing said low and high energy projections, both measured by at least a portion of the scanner's detector array covered by said copper filter.

22. The system of claim 19, wherein Component B for computing voltage ratios includes a module constructed and arranged so as to compute a voltage m-ratio and a voltage n-ratio.

23. The system of claim 22, wherein Component C for computing HVPS DC and AC voltages includes a module constructed and arranged so as to compute the HVPS DC and AC voltages as functions of said voltage m-ratio and said voltage n-ratio.

24. The system of claim 19, wherein Component D includes a comparator constructed and arranged so as to compare the computed voltages with the commanded voltages.

25. The system of claim 19, wherein Component D includes an integrator constructed and arranged so as to integrate differences between the computed voltages and commanded voltages.

26. The system of claim 25, wherein Component D includes an adder constructed and arranged so as to add the integrated voltage differences to the commanded voltages.

27. The system of claim 19, further including a calibration module constructed and arranged so as to perform a calibration procedure.

28. The system of claim 27, wherein the calibration module includes a unit constructed and arranged so as to compute air parameters from said low and high energy projections and said DC and AC voltages.

29. The system of claim 17, wherein the calibration module includes a unit constructed and arranged so as to compute copper parameters from said low and high energy projections and said DC and AC voltages.

* * * * *